US012684558B2

(12) United States Patent
Lei

(10) Patent No.: US 12,684,558 B2
(45) Date of Patent: Jul. 14, 2026

(54) CROSS-CARRIER CHANNEL REPETITION TRANSMISSION METHOD AND APPARATUS, STORAGE MEDIUM, TERMINAL, AND NETWORK DEVICE

(71) Applicant: SPREADTRUM SEMICONDUCTOR (NANJING) CO., LTD., Nanjing (CN)

(72) Inventor: Zhenzhu Lei, Zhangjiang (CN)

(73) Assignee: SPREADTRUM SEMICONDUCTOR (NANJING) CO., LTD., Nanjing (CN)

( * ) Notice: Subject to any disclaimer, the term of this patent is extended or adjusted under 35 U.S.C. 154(b) by 304 days.

(21) Appl. No.: 18/274,825

(22) PCT Filed: Jan. 29, 2022

(86) PCT No.: PCT/CN2022/074858
§ 371 (c)(1),
(2) Date: Jul. 28, 2023

(87) PCT Pub. No.: WO2022/161483
PCT Pub. Date: Aug. 4, 2022

(65) Prior Publication Data
US 2024/0121772 A1 Apr. 11, 2024

(30) Foreign Application Priority Data

Jan. 29, 2021 (CN) .......................... 202110128798.8

(51) Int. Cl.
*H04W 72/1263* (2023.01)
*H04L 1/08* (2006.01)

(52) U.S. Cl.
CPC ........... *H04W 72/1263* (2013.01); *H04L 1/08* (2013.01)

(58) Field of Classification Search
CPC ......... H04W 72/1263; H04W 72/1273; H04W 72/23; H04W 4/70; H04W 36/00;
(Continued)

(56) References Cited

U.S. PATENT DOCUMENTS

2013/0215853 A1 8/2013 Li et al.
2014/0098774 A1 4/2014 Gao et al.
(Continued)

FOREIGN PATENT DOCUMENTS

CN 103181093 A 6/2013
CN 103368708 A 10/2013
(Continued)

OTHER PUBLICATIONS

SIPO Second Office Action for corresponding CN Application No. 202110128798.8; Issued Jul. 31, 2025.
(Continued)

*Primary Examiner* — Chae S Lee
(74) *Attorney, Agent, or Firm* — CANTOR COLBURN LLP

(57) ABSTRACT

A cross-carrier channel repetition transmission method and apparatus, a storage medium, a terminal, and a network device are provided. The method includes: receiving a scheduling instruction for data transmission from a network device, wherein the scheduling instruction indicates that cross-carrier scheduling/cross-carrier transmission occurs in a current data transmission; and determining a number of channel repetition transmissions for the current data transmission based on a number of channel repetition transmissions of an original carrier and/or a target carrier; wherein the cross-carrier scheduling includes that the network device transmits the scheduling instruction on the original carrier and instructs a terminal to perform data transmission on the target carrier, and the cross-carrier transmission includes that the network device transmits the scheduling instruction on the original carrier and instructs the terminal to perform data transmission on the original carrier and the target carrier.

12 Claims, 5 Drawing Sheets

(58) Field of Classification Search
 CPC ............. H04W 36/06; H04W 72/0453; H04W
  72/1268; H04L 1/08; H04L 5/00
 See application file for complete search history.

(56) References Cited

U.S. PATENT DOCUMENTS

| | | | |
|---|---|---|---|
| 2017/0164396 A1 | 6/2017 | Matsumoto et al. | |
| 2018/0054808 A1* | 2/2018 | Pan ......................... | H04L 5/001 |
| 2019/0313390 A1* | 10/2019 | Cheng ................... | H04L 5/0053 |
| 2019/0357238 A1* | 11/2019 | Zhou ..................... | H04W 72/23 |
| 2020/0322256 A1 | 10/2020 | Tang | |
| 2020/0374908 A1* | 11/2020 | Zhu ....................... | H04L 5/0098 |
| 2022/0095345 A1* | 3/2022 | Chen ..................... | H04L 1/1819 |
| 2023/0319940 A1 | 10/2023 | Xu | |

FOREIGN PATENT DOCUMENTS

| | | |
|---|---|---|
| CN | 103609186 A | 2/2014 |
| CN | 110447261 A | 11/2019 |
| CN | 112055360 A | 12/2020 |
| WO | 2020061859 A1 | 4/2020 |
| WO | 2020243930 A1 | 12/2020 |

OTHER PUBLICATIONS

SIPO First Office Action for corresponding CN Application No. 202110128798.8; Issued Dec. 28, 2024.
International Search Report for International Application No. PCT/CN2022/074858; Mailing Date, Mar. 30, 2022.

\* cited by examiner

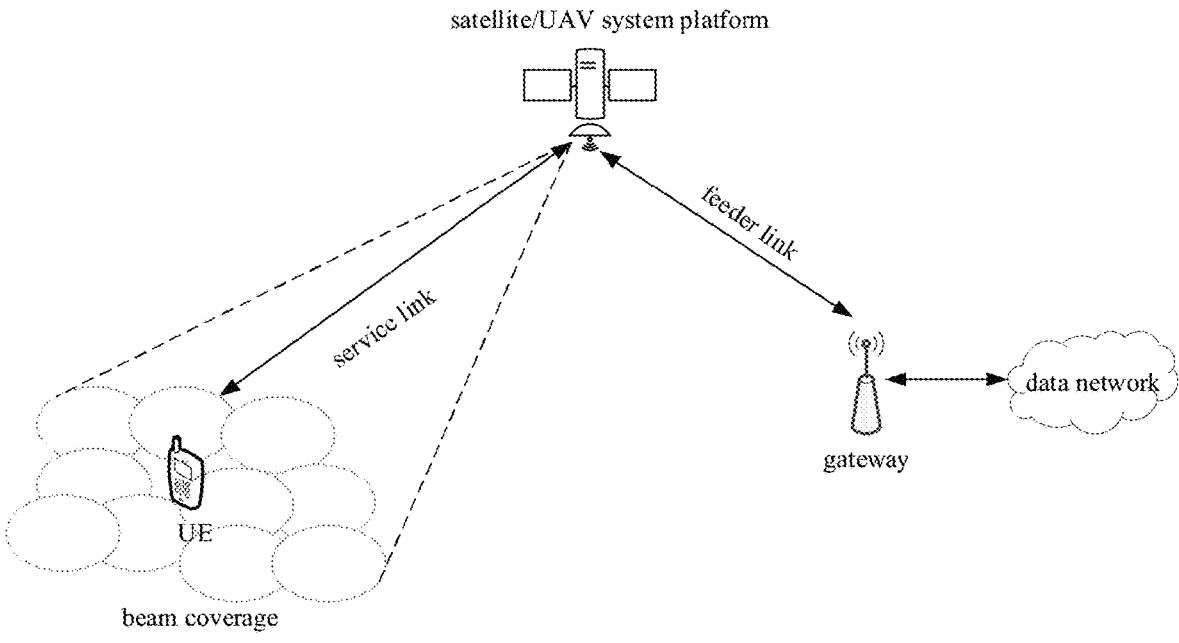

satellite/UAV system platform feeder link service link data network gateway

UE beam coverage

FIG. 1

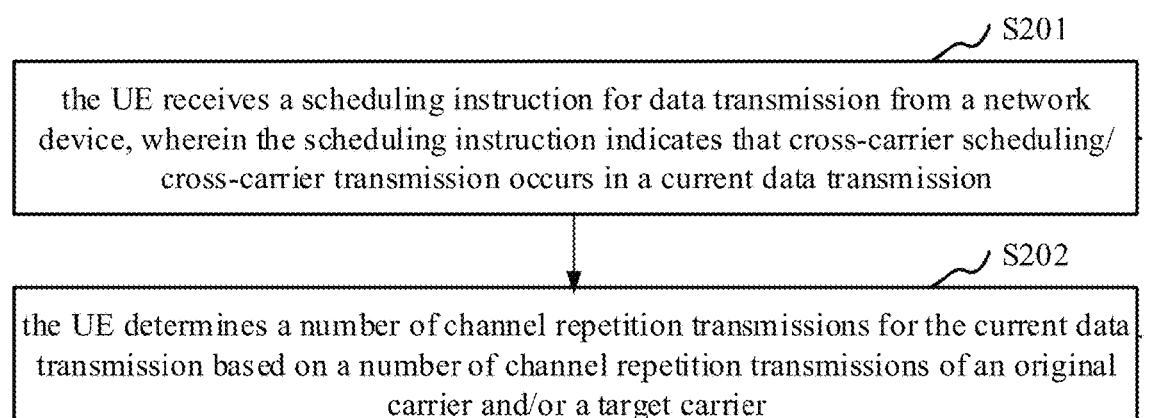

S201 the UE receives a scheduling instruction for data transmission from a network device, wherein the scheduling instruction indicates that cross-carrier scheduling/ cross-carrier transmission occurs in a current data transmission

S202 the UE determines a number of channel repetition transmissions for the current data transmission based on a number of channel repetition transmissions of an original carrier and/or a target carrier

FIG. 2

CROSS-CARRIER CHANNEL REPETITION TRANSMISSION METHOD AND APPARATUS, STORAGE MEDIUM, TERMINAL, AND NETWORK DEVICE

CROSS-REFERENCE TO RELATED APPLICATIONS

This is the U.S. national stage of application No. PCT/CN2022/074858, filed on Jan. 29, 2022. Priority under 35 U.S.C. § 119(a) and 35 U.S.C. § 365(b) is claimed from Chinese Application No. 202110128798.8, filed Jan. 29, 2021, the disclosure of which is also incorporated herein by reference.

TECHNICAL FIELD

The present disclosure generally relates to communication technology field, and more particularly, to a cross-carrier channel repetition transmission method and apparatus, a storage medium, a terminal, and a network device.

BACKGROUND

In current Internet of Things standards, Narrow Band Internet of Things (NB-IoT)/Enhance Machine Type Communication (eMTC) adopts repetition transmission technology to ensure coverage. For downlink transmission, a maximum number of repetitions is 2048, and for uplink transmission, a maximum number of repetitions is 128.

In a Non Terrestrial Networks (NTN) scenario, a cell consists of multiple beams. Due to fast movement of satellites, a User Equipment (UE) needs to perform beam switching frequently. In the future, IoT devices need to have a set of beam management mechanism to access through a satellite network, that is, current NB-IoT/eMTC standards do not support the beam management mechanism. At present, a more possible beam management method is through carrier switching, that is, a cell consists of multiple beams, different beams correspond to different carriers, and beam switching is realized through carrier switching.

SUMMARY

Embodiments of the present disclosure enable a UE to determine a value of a number of channel repetition transmissions in a cross-carrier scheduling/transmission scenario.

In an embodiment of the present disclosure, a cross-carrier channel repetition transmission method is provided, including: receiving a scheduling instruction for data transmission from a network device, wherein the scheduling instruction indicates that cross-carrier scheduling/cross-carrier transmission occurs in a current data transmission; and determining a number of channel repetition transmissions for the current data transmission based on a number of channel repetition transmissions of an original carrier and/or a target carrier; wherein the cross-carrier scheduling includes that the network device transmits the scheduling instruction on the original carrier and instructs a terminal to perform data transmission on the target carrier, and the cross-carrier transmission includes that the network device transmits the scheduling instruction on the original carrier and instructs the terminal to perform data transmission on the original carrier and the target carrier.

In an embodiment of the present disclosure, a storage medium having computer instructions stored therein is provided, wherein when the computer instructions are executed, any one of the above methods is performed.

In an embodiment of the present disclosure, a terminal including the above apparatus or including a memory and a processor is provided, wherein the memory has computer instructions stored therein, and when the processor executes the computer instructions, any one of the above methods is performed.

BRIEF DESCRIPTION OF THE DRAWINGS

FIG. 1 is a diagram of a cell and beams in an NTN scenario in exiting techniques.

FIG. 2 is a flow chart of a cross-carrier channel repetition transmission method according to an embodiment.

DETAILED DESCRIPTION

Figure 3:
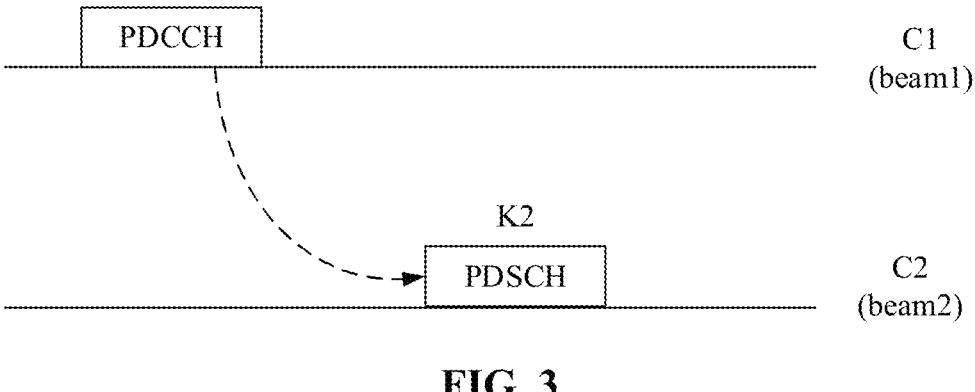
FIG. 3 is a diagram of PDSCH scheduling according to an embodiment.

In a multi-carrier mechanism of NB-IoT, as a single-frequency cell of NB-IoT only has a bandwidth of 180 kilohertz (kHz), in addition to overhead of Narrowband Primary Synchronization Signal (NPSS), Narrowband Secondary Synchronization Signal (NSSS) and SIB, the remaining service channel capacity on the bandwidth is very small. To support a large number of terminals, it is necessary to use multiple frequency points to increase network capacity. In addition to an anchor carrier including NPSS, NSSS and Narrowband Physical Broadcast Channel (NPBCH), the cell can also include several non-anchor carriers that do not include NPSS, NSSS and NPBCH. One cell includes an anchor carrier and several non-anchor carriers, each carrier has a spectrum bandwidth of 180 kHz, and a maximum spectrum span of all carriers in the cell does not exceed 20 MHz.

There is only one downlink carrier in a multi-carrier cell that supports simultaneous carrying of NPSS, NSSS, NPBCH, NPDCCH and Narrowband Physical Downlink Control Channel (NPDCCH). This carrier is called the anchor carrier. The UE needs to monitor NPSS, NSSS, NPBCH, NPDCCH and Narrowband Physical Downlink Shared Channel (NPDSCH) information on the anchor carrier.

In a multi-carrier cell, there may be several downlink carriers that only carry NPDCCH and NPDSCH, but do not carry NPSS, NSSS and NPBCH. These carriers are called the non-anchor carriers. The UE can perform data transmission on the non-anchor carriers. In addition, before the UE enters a connected state, a network may designate a carrier for subsequent downlink data transmission through Msg4. The UE can monitor paging on the non-anchor carriers in an idle state.

Referring to FIG. 1, FIG. 1 is a diagram of a cell and beams in an NTN scenario in exiting techniques. In an NTN scenario, a cell consists of multiple beams. Due to fast movement of a satellite, a UE needs to perform beam switching frequently. In the future, IoT devices need to have a set of beam management mechanism for accessing through a satellite network (a current terrestrial network IoT standard, namely NB-IoT/eMTC, does not support the beam management mechanism). At present, a more possible beam management method is through carrier switching, that is, a cell consists of multiple beams, different beams correspond to different carriers, and beam switching is realized through carrier switching.

In addition, in the current IoT standards, NB-IOT/eMTC adopts repetition transmission technology to ensure coverage. For downlink transmission, a maximum number of repetitions is 2048, and for uplink transmission, a maximum number of repetitions is 128. Due to repetition transmission, one data scheduling needs to last for a long time, which causes beam switching (i.e., carrier switching) to the UE during data transmission. The data transmission includes Physical Downlink Shared Channel (PDSCH)/Physical Uplink Shared Channel (PUSCH) transmission. A number of actual repetition transmissions of PDSCH/PUSCH is dynamically indicated by its corresponding scheduling Downlink Control Information (DCI) using a specific bit field. The UE can determine the number of repetition transmissions of PDSCH/PUSCH based on the DCI carried by a Physical Downlink Control Channel (PDCCH). A maximum number (i.e., Rmax) of repetition transmissions of PDCCH is semi-statically configured by Radio Resource Control (RRC)/System Information Block (SIB).

At present, in a satellite communication system, a number of channel (including channels such as PUSCH/PDSCH) repetition transmissions is configured at a beam level, that is, different values or sets of values for the number of channel repetition transmissions are configured for different beams. In the satellite IoT, as different beams correspond to different carriers, configuration of the number of channel repetition transmissions at the beam level is equivalent to configuration of the number of channel repetition transmissions at the carrier level, that is, different carriers correspond to different values or sets of values for the number of channel repetition transmissions.

Due to repetition transmissions, a data scheduling needs to last for a long time, which causes beam switching (i.e., carrier switching) to the UE during a data transmission (PDSCH/PUSCH transmission). Future satellite IoT scenarios are likely to indicate cross-carrier scheduling/cross-carrier transmission (that is, data scheduled by the network at one time is transmitted on different carriers). In cross-carrier scheduling and cross-carrier transmission scenarios, considering configuration for the number of the channel repetition transmissions at the beam level (i.e., carrier level), how to determine the value of the number of the channel repetition transmissions by the UE is a problem to be solved.

Embodiments of the present disclosure provide a cross-carrier channel repetition transmission method. The method includes: receiving a scheduling instruction for data transmission from a network device, wherein the scheduling instruction indicates that cross-carrier scheduling/cross-carrier transmission occurs in a current data transmission; and determining a number of channel repetition transmissions for the current data transmission based on a number of channel repetition transmissions of an original carrier and/or a target carrier; wherein the cross-carrier scheduling includes that the network device transmits the scheduling instruction on the original carrier and instructs a terminal to perform data transmission on the target carrier, and the cross-carrier transmission includes that the network device transmits the scheduling instruction on the original carrier and instructs the terminal to perform data transmission on the original carrier and the target carrier. In this manner, the UE can determine the number of channel repetition transmissions in a cross-carrier scheduling/transmission scenario.

In order to clarify the objects, characteristics and advantages of the disclosure, embodiments of present disclosure will be described in detail in conjunction with accompanying drawings.

Referring to FIG. 2, FIG. 2 is a flow chart of a cross-carrier channel repetition transmission method according to an embodiment. The method is performed by a terminal which may be a UE or other devices, such as a cell phone, a computer or a mobile watch. In the below embodiment, the UE performs the method. The method includes S201 and S202.

In S201, the UE receives a scheduling instruction for data transmission from a network device, wherein the scheduling instruction indicates that cross-carrier scheduling/cross-carrier transmission occurs in a current data transmission.

In S202, the UE determines a number of channel repetition transmissions for the current data transmission based on a number of channel repetition transmissions of an original carrier and/or a target carrier.

The cross-carrier scheduling includes that the network device transmits the scheduling instruction on the original carrier and instructs a terminal to perform data transmission on the target carrier, and the cross-carrier transmission includes that the network device transmits the scheduling instruction on the original carrier and instructs the terminal to perform data transmission on the original carrier and the target carrier.

In a satellite IoT scenario, different beams correspond to different carriers, and beam switching is equivalent to carrier switching. In existing standards, a network device configures different numbers of channel (including PUSCH/PDSCH) repetition transmissions for different carriers through system broadcast messages or RRC dedicated signaling, so that different beams correspond to different channel repetition transmissions. A UE determines a value or a value set of the number of channel repetition transmissions corresponding to each carrier by receiving the system broadcast messages or the RRC dedicated signaling issued by the network. The original carrier is a carrier corresponding to a beam before the beam switching, and the target carrier is a carrier corresponding to a beam after the beam switching. A reason for the carrier switching is that the UE frequently undergoes beam switching due to rapid movement of the satellite. The target carrier and the original carrier are generally different carriers.

The scheduling instruction is an instruction for the network device to schedule the UE for data transmission. If the UE undergoes carrier switching (i.e., beam switching) during the data transmission, the network device can instruct the UE cross-carrier (also called cross-beam) scheduling or cross-carrier transmission through the scheduling instruction. Optionally, the scheduling instruction is scheduling information (grant) or other forms of instructions carried in DCI and/or Random Access Response (RAR). Further, the scheduling instruction may be scheduling DCI in the existing techniques or may be additionally designed DCI.

Optionally, channels for the current data transmission at least include PUSCH, PDSCH and so on. Accordingly, for PUSCH and PDSCH, DCI or RAR grant may serve as the scheduling instruction.

In the method as shown in FIG. 2, after receiving the scheduling instruction, the UE may determine the number of channel repetition transmissions for cross-carrier scheduling/transmission based on a number of channel repetition transmissions of an original carrier and/or a number of channel repetition transmissions of a target carrier configured by RRC dedicated signaling or system broadcast messages in an original standard. In this manner, the UE can determine the number of channel repetition transmissions in a cross-carrier scheduling/transmission scenario and complete a current data transmission on the original carrier and/or the target carrier based on the number of channel repetition transmissions.

In some embodiments, the scheduling instruction indicates that cross-carrier scheduling occurs, and S202 in FIG. 2 includes: determining the number of channel repetition transmissions for the current data transmission based on the number of channel repetition transmissions of the target carrier. Following S202, the method further includes: performing data transmission on the target carrier with the network device using the number of channel repetition transmissions for the current data transmission.

When the network performs cross-carrier scheduling (i.e., cross-beam scheduling), the UE takes the number of channel repetition transmissions of the target carrier configured by RRC dedicated signaling or system broadcast messages in the existing standard as the number of channel repetition transmissions for the current data transmission. An index of the target switching carrier is determined according to a specific bit field in the scheduling instruction (DCI or RAR grant). That is, the network device may indicate the index of the target switching carrier for carrier switching in the scheduling instruction, to make the UE determine the target carrier according to the index and obtain the number of channel repetition transmissions of the target carrier as the number of channel repetition transmissions for the current data transmission based on the existing standard or configuration in RRC dedicated signaling or system broadcast messages. The UE may perform data transmission with the network device on the target carrier using the number of channel repetition transmissions for the current data transmission according to scheduling of the scheduling instruction.

Referring to FIG. 3, FIG. 3 is a diagram of PDSCH scheduling according to an embodiment. Taking PDCCH scheduling PDSCH as an example, carrier C1 is an original carrier receiving a scheduling instruction, a number of PDSCH repetition transmissions corresponding to the carrier C1 (its corresponding beam is beam1) is K1, and a number of PDSCH repetition transmissions corresponding to the carrier C2 (its corresponding beam is beam2) is K2. If cross-carrier scheduling occurs, the UE determines a number of channel repetition transmissions for a current data transmission based on the number K2 of channel repetition transmissions corresponding to the target carrier (i.e., carrier C2), that is, the UE can determine that the number of channel repetition transmissions for the current data transmission is K2.

Optionally, based on that the number of channel repetition transmissions of the target carrier includes multiple values, the scheduling instruction further indicates one of the multiple values; and said determining the number of channel repetition transmissions for the current data transmission based on the number of channel repetition transmissions of the target carrier includes: determining the one of the multiple values based on the scheduling instruction, and determining the number of channel repetition transmissions for the current data transmission based on the determined value.

In the existing techniques, the network may also configure a value set of the number of channel repetition transmissions of the target carrier for the UE through RRC signaling or system broadcast messages, that is, the number of the channel transmissions of the target carrier includes multiple values. When the network performs cross-carrier scheduling, the value of the channel repetition transmissions that can be indicated by a specific bit field in the scheduling instruction is one in the value set of the channel repetition transmissions of the target carrier configured by the network. According to the indication of the specific bit field in the scheduling instruction, the UE determines a value from the value set of channel repetition transmissions corresponding to the target carrier, so as to determine the number of channel repetition transmissions for the current data transmission.

Figure 4:
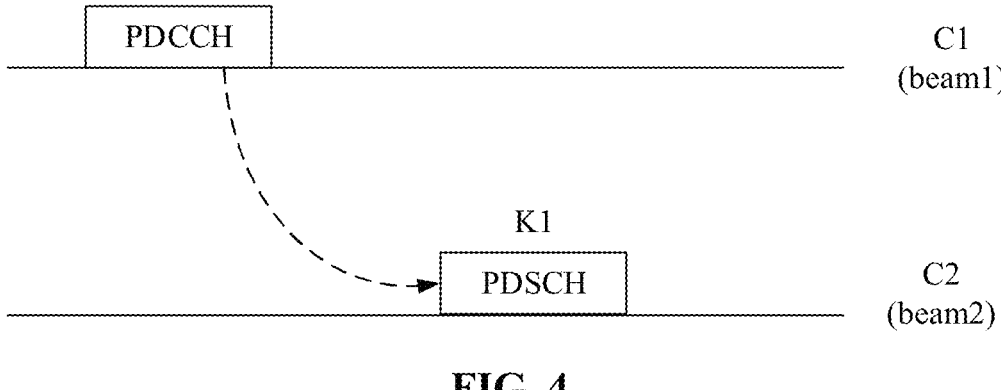
FIG. 4 is a diagram of PDSCH scheduling according to an embodiment.

Referring to FIG. 4, FIG. 4 is a diagram of PDSCH scheduling according to an embodiment. Taking PDCCH scheduling PDSCH as an example, carrier C1 is an original carrier receiving a scheduling instruction, a value set of a number of PDSCH repetition transmissions corresponding to the carrier C1 (its corresponding beam is beam1) including two values, i.e., K1 and K2, and a value set of a number of PDSCH repetition transmissions corresponding to the carrier C2 (its corresponding beam is beam2) including two values, i.e., K3 and K4. If cross-carrier scheduling occurs, assuming that the target carrier indicated by the scheduling instruction is carrier C2, a bit field in the scheduling instruction used to indicate the value of the number of repetition transmissions of PDSCH indicates one in the value set of the number of PDSCH repetition transmissions corresponding to the carrier C2. Assuming that the bit field includes 1 bit, if the value of the 1 bit is 0, it means that the number of repetition transmissions of the current data transmission is K3; or if the value of the 1 bit is 1, it means that the number of repetition transmissions of the current data transmission is K4. Alternatively, the bit values corresponding to K3 and K4 may be exchanged.

Optionally, S202 in FIG. 1 includes: selecting a maximum one among the number of channel repetition transmissions of the original carrier and the number of channel repetition transmissions of the target carrier; and determining the number of channel repetition transmissions for the current data transmission based on the maximum one. Specifically, the maximum one serves as the number of channel repetition transmissions for the current data transmission.

Figure 5:
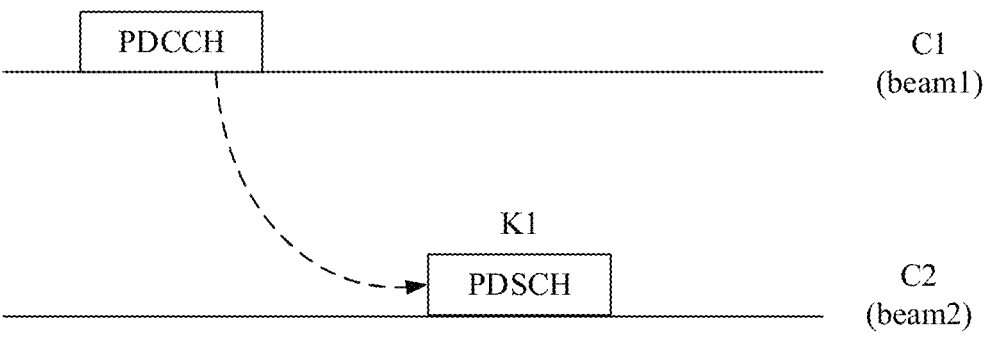
FIG. 5 is a diagram of PDSCH scheduling according to an embodiment.

Referring to FIG. 5. FIG. 5 is a diagram of PDSCH scheduling according to an embodiment. Taking PDCCH scheduling PDSCH as an example, carrier C1 is an original carrier receiving a scheduling instruction, a number of PDSCH repetition transmissions corresponding to the carrier C1 is K1, and a number of PDSCH repetition transmissions corresponding to the carrier C2 is K2, where K1>K2. If cross-carrier scheduling occurs, the UE determines a number of channel repetition transmissions for a current data transmission based on a larger one between the number of PDSCH repetition transmissions corresponding to the original carrier C1 and the number of PDSCH repetition transmissions corresponding to the target carrier C2, that is, the UE can determine that the number of channel repetition transmissions for the current data transmission is K1.

In addition, if the number of channel repetition transmissions configured for the original carrier or the target carrier has multiple values, one with the largest value can be selected from the multiple values of the number of channel repetition transmissions configured for the original carrier and the target carrier as the number of channel repetition transmissions for the current data transmission.

In some embodiments, the UE may determine the number of channel repetition transmissions for data transmission of cross-carrier scheduling for different configurations of the number of channel repetition transmissions in existing techniques, based on indication of different bit fields in the scheduling instruction.

In some embodiments, the scheduling instruction indicates that cross-carrier transmission occurs, and following S202 in FIG. 2, the method further includes: determining to perform data transmission on the original carrier with the network device for a portion of the number of channel repetition transmissions for the current data transmission; and determining to perform data transmission on the target carrier with the network device for remaining of the number of channel repetition transmissions for the current data transmission.

If the current data transmission is cross-carrier transmission, the current data transmission requires both the original carrier and the target carrier to participate in the data transmission. The number of channel repetition transmissions for the current data transmission includes the number of actual channel repetition transmissions of the original carrier and the number of actual channel repetition transmissions of the target carrier.

Optionally, the scheduling instruction further indicates an index of a transmission coefficient, and the method further includes: determining the transmission coefficient based on the index of the transmission coefficient, wherein the transmission coefficient indicates a ratio of a number of actual channel repetition transmissions of the original carrier/target carrier in the current data transmission to the number of channel repetition transmissions for the current data transmission; and determining, based on the transmission coefficient, the number of actual channel repetition transmissions of the original carrier in the current data transmission, and the number of actual channel repetition transmissions of the target carrier in the current data transmission.

That is, the scheduling instruction may indicate the index of the transmission coefficient, and the UE determines the number of actual channel repetition transmissions of the original carrier in the current data transmission, and the number of actual channel repetition transmissions of the target carrier in the current data transmission based on the transmission coefficient indicated by the index. Optionally, the index of the transmission coefficient may be a value index of the transmission coefficient or the like.

Optionally, said determining, based on the transmission coefficient, the number of actual channel repetition transmissions of the original carrier in the current data transmission, and the number of actual channel repetition transmissions of the target carrier in the current data transmission includes: calculating a product of the number of channel repetition transmissions for the current data transmission and the transmission coefficient, and determining the number of actual channel repetition transmissions of one of the original carrier and target carrier in the current data transmission based on the product; and calculating a difference between the number of channel repetition transmissions for the current data transmission and the product, and determining the number of actual channel repetition transmissions of the other of the original carrier and target carrier in the current data transmission based on the difference.

The transmission coefficient may indicate a ratio L of a number of actual channel repetition transmissions of the original carrier in the current data transmission to the number of channel repetition transmissions for the current data transmission, and accordingly a ratio of a number of actual channel repetition transmissions of the target carrier in the current data transmission to the number of channel repetition transmissions for the current data transmission is denoted by (1-L). In this case, the number of actual channel repetition transmissions of the original carrier in the current data transmission is equal to a product of the number of channel repetition transmissions for the current data transmission and L, and the number of actual channel repetition transmissions of the target carrier in the current data transmission is equal to a product of the number of channel repetition transmissions for the current data transmission and (1-L).

Alternatively, the transmission coefficient may indicate a ratio L of a number of actual channel repetition transmissions of the target carrier in the current data transmission to the number of channel repetition transmissions for the current data transmission, and accordingly a ratio of a number of actual channel repetition transmissions of the original carrier in the current data transmission to the number of channel repetition transmissions for the current data transmission is denoted by (1-L). In this case, the number of actual channel repetition transmissions of the original carrier in the current data transmission is equal to a product of the number of channel repetition transmissions for the current data transmission and (1-L), and the number of actual channel repetition transmissions of the target carrier in the current data transmission is equal to a product of the number of channel repetition transmissions for the current data transmission and L.

Optionally, a maximum one among the number of channel repetition transmissions of the original carrier and the number of channel repetition transmissions of the target carrier is selected, and the number of channel repetition transmissions for the current data transmission is determined based on the maximum one.

Figure 6:
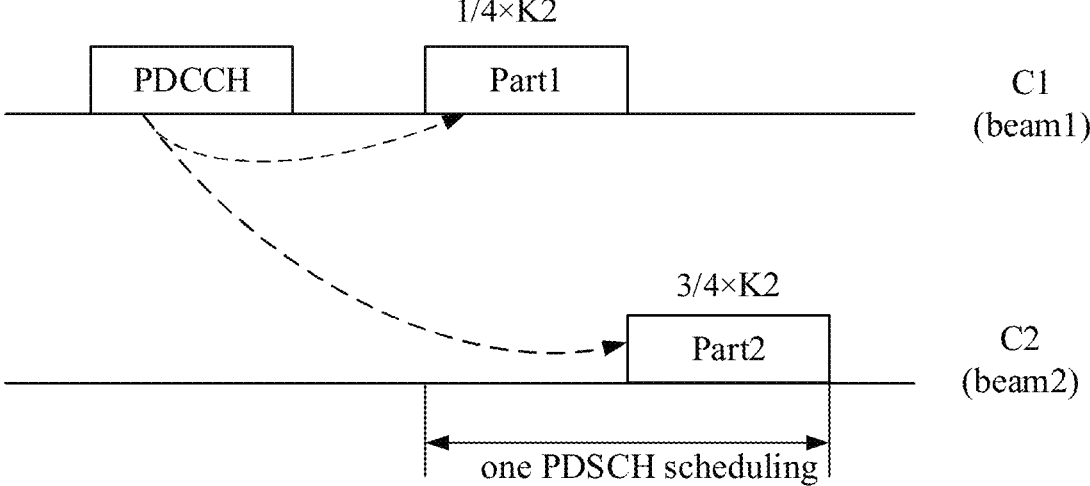
FIG. 6 is a diagram of PDSCH scheduling according to an embodiment.

Referring to FIG. 6. FIG. 6 is a diagram of PDSCH scheduling according to an embodiment. Taking PDCCH scheduling PDSCH as an example, carrier C1 is an original carrier, a number of PDSCH repetition transmissions corresponding to the carrier C1 is K1, and a number of PDSCH repetition transmissions corresponding to the carrier C2 is K2, where K2>K1. A transmission coefficient corresponding to the original carrier indicated by the scheduling instruction is ¼, and accordingly, a transmission coefficient corresponding to the target carrier is (1−¼=¾). The UE takes the number K2 of PDSCH repetition transmissions of the carrier C2 as the number of channel repetition transmissions for the current data transmission, that is, the number of PDSCH repetition transmissions of the original carrier (i.e., Part1 in FIG. 6) is (¼×K2), and the number of PDSCH repetition transmissions of the target carrier (i.e., Part2 in FIG. 6) is (¾×K2).

Optionally, the number of channel repetition transmissions for the current data transmission is determined to be the number of channel repetition transmissions of one of the original carrier and the target carrier based on the transmission coefficient.

Specifically, the UE determines whether to use the number of channel repetition transmissions of the original carrier or the number of channel repetition transmissions of the target carrier to determine the number of channel repetition transmissions for the current data transmission based on a value of the transmission coefficient indicated by the scheduling instruction and a threshold of the transmission coefficient configured by the network. For example, if the value of the transmission coefficient indicated by the scheduling instruction is smaller than the threshold, the UE uses the number of channel repetition transmissions of the target carrier to determine the number of channel repetition transmissions for the current data transmission; or if the value of the transmission coefficient indicated by the scheduling instruction is not smaller than the threshold, the UE uses the number of channel repetition transmissions of the original carrier to determine the number of repetition transmissions of currently scheduled data. It should be noted that a relationship between the transmission coefficient and the original carrier/target carrier or the threshold includes but is not limited to the above-mentioned examples. Any solution that can determine the number of channel repetition transmissions for the current data transmission is the number of channel repetition transmissions of one of the original carrier and the target carrier based on the transmission coefficient falls into the scope of embodiments of the present disclosure.

Figure 7:
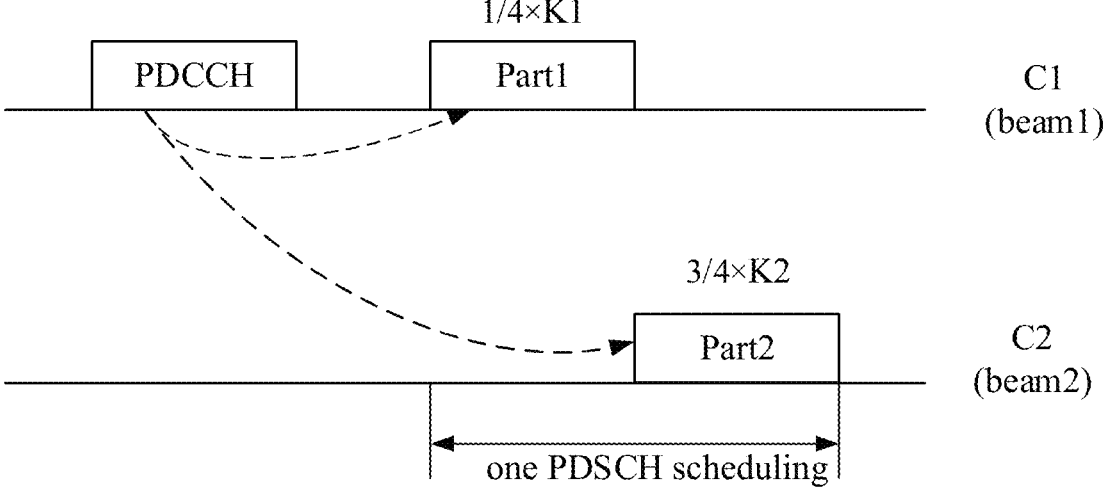
FIG. 7 is a diagram of PDSCH scheduling according to an embodiment.

Referring to FIG. 7. FIG. 7 is a diagram of PDSCH scheduling according to an embodiment. Taking PDCCH scheduling PDSCH as an example, carrier C1 is an original carrier, a number of PDSCH repetition transmissions corresponding to the carrier C1 is K1, and a number of PDSCH repetition transmissions corresponding to the carrier C2 is K2, and a threshold of transmission coefficient configured by the network is ½. A transmission coefficient corresponding to the original carrier indicated by the scheduling instruction is ¼, and accordingly, a transmission coefficient corresponding to the target carrier is (1−¼=¾). As ¼<½, the UE takes the number K2 of PDSCH repetition transmissions of the target carrier C2 as the number of channel repetition transmissions for the current data transmission. Therefore, the UE determines that the number of PDSCH repetition transmissions of the original carrier (i.e., Part1 in FIG. 7) is (¼×K2), and the number of PDSCH repetition transmissions of the target carrier (i.e., Part2 in FIG. 7) is (¾×K2).

Optionally, said determining, based on the transmission coefficient, the number of actual channel repetition transmissions of the original carrier in the current data transmission, and the number of actual channel repetition transmissions of the target carrier in the current data transmission includes: calculating a product of the number of channel repetition transmissions of one of the original carrier and the target carrier and the transmission coefficient, as the number of actual channel repetition transmissions of the one carrier; calculating a difference between 1 and the transmission coefficient, and recording the difference as an intermediate coefficient; and calculating a product of the number of channel repetition transmissions of the other of the original carrier and the target carrier and the intermediate coefficient, as the number of actual channel repetition transmissions of the other carrier.

The number of actual channel repetition transmissions of the original carrier is determined based on the number of channel repetition transmissions of the original carrier configured by RRC signaling or system broadcast messages, and the number of actual channel repetition transmissions of the target carrier is determined based on the number of channel repetition transmissions of the target carrier configured by RRC signaling or system broadcast messages. When the network performs cross-carrier transmission, the scheduling instruction indicates a transmission coefficient L of the original carrier (i.e., a transmission coefficient), and accordingly a transmission coefficient of the target carrier (i.e., an intermediate coefficient) is denoted as (1-L). Alternatively, the scheduling instruction indicates a transmission coefficient L of the target carrier (i.e., a transmission coefficient), and accordingly a transmission coefficient of the original carrier (i.e., an intermediate coefficient) is denoted as (1-L).

Figure 8:
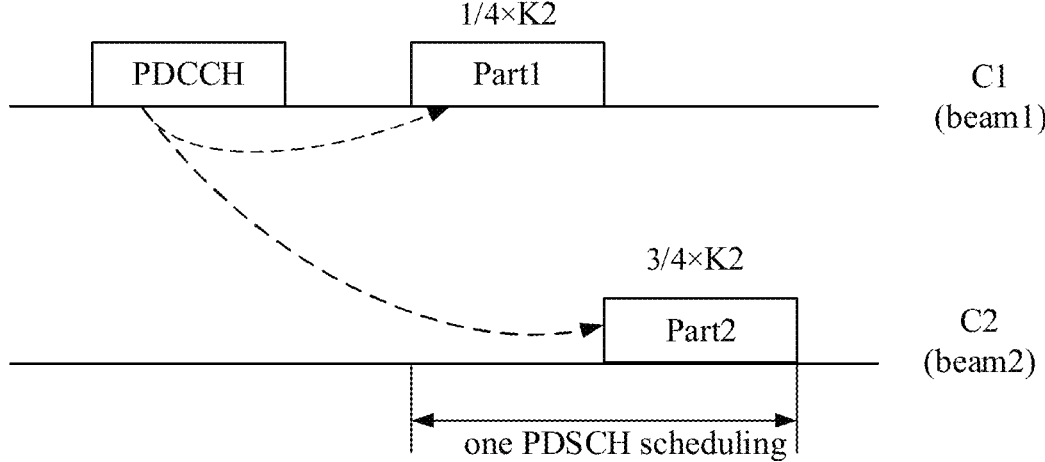
FIG. 8 is a diagram of PDSCH scheduling according to an embodiment.

Referring to FIG. 8. FIG. 8 is a diagram of PDSCH scheduling according to an embodiment. Taking PDCCH scheduling PDSCH as an example, carrier C1 is an original carrier, a number of PDSCH repetition transmissions corresponding to the carrier C1 is K1, and a number of PDSCH repetition transmissions corresponding to the carrier C2 is K2. A transmission coefficient corresponding to the original carrier indicated by the scheduling instruction is ¼, and accordingly, a transmission coefficient corresponding to the target carrier is (1−¼=¾). The UE determines that the number of actual PDSCH repetition transmissions of the original carrier (i.e., Part1 in FIG. 8) is (¼×K1), and the number of actual PDSCH repetition transmissions of target carrier (i.e., Part2 in FIG. 8) is (¾×K2).

In some embodiments, the scheduling instruction indicates that the cross-carrier transmission occurs, and said determining the number of channel repetition transmissions for the current data transmission based on the number of channel repetition transmissions of the original carrier and/or the target carrier includes: determining a number of actual repetition transmissions for data transmitted on the original carrier in the current data transmission based on the number of channel repetition transmissions of the original carrier; and determining a number of actual repetition transmissions for data transmitted on the target carrier in the current data transmission based on the number of channel repetition transmissions of the original carrier.

Optionally, the scheduling instruction further indicates data transmitted on the original carrier and/or data transmitted on the target carrier for the current data transmission. That is, the transmission data scheduled by scheduling DCI currently is divided, where a portion of the transmission data is transmitted through the original carrier, and the remaining portion of the transmission data is transmitted through the target carrier. The numbers of channel repetition transmissions of the original carrier and the target carrier are still configured according to the existing standards.

Optionally, the data partly takes TB as a granularity unit.

In the exiting techniques, there is a Multi-TB scheduling mechanism. Specifically, to increase a data transmission rate and reduce control signaling overhead, NB-IOT/eMTC introduces Multi-TB scheduling, that is, a DCI can schedule multiple TBs. For multi-TB cross-beam transmission, a network instructs a portion of the TBs to be transmitted on the original carrier and another portion of the TBs to be transmitted on the target carrier through a scheduling instruction.

Figure 9:
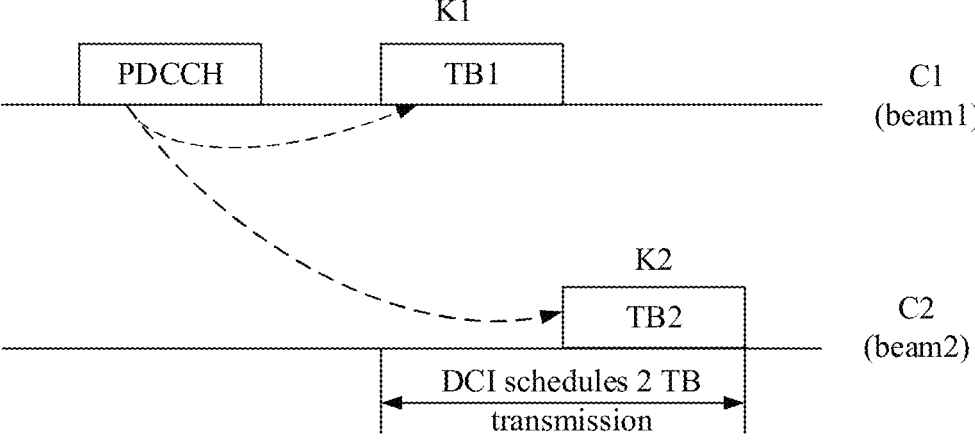
FIG. 9 is a diagram of PDSCH scheduling according to an embodiment.

Referring to FIG. 9. FIG. 9 is a diagram of PDSCH scheduling according to an embodiment. Taking PDCCH scheduling PDSCH as an example, carrier C1 is an original carrier, a number of PDSCH repetition transmissions corresponding to the carrier C1 is K1, and a number of PDSCH repetition transmissions corresponding to the carrier C2 is K2. Assuming that current data transmission of a network schedules 2 TBs including TB1 and TB2. TB1 is transmitted on the original carrier, and a number of actual PDSCH repetition transmissions is K1. TB2 is transmitted on the target carrier, and a number of actual PDSCH repetition transmissions is K2.

In the above embodiments, the UE may determine the number of channel repetition transmissions for data transmission of cross-carrier transmission for different configurations of the number of channel repetition transmissions in existing techniques, based on indication of different bit fields in the scheduling instruction.

Figure 10:
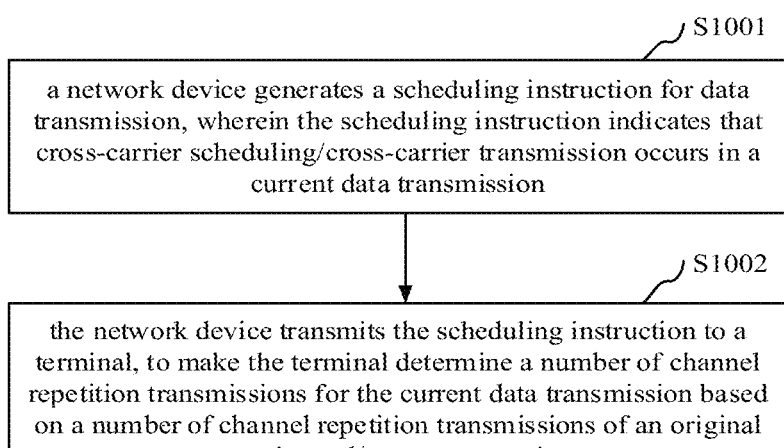
FIG. 10 is a flow chart of a cross-carrier channel repetition transmission method according to an embodiment.

Referring to FIG. 10, FIG. 10 is a flow chart of a cross-carrier channel repetition transmission according to an embodiment. The method includes S1001 and S1002.

In S1001, a network device generates a scheduling instruction for data transmission, wherein the scheduling instruction indicates that cross-carrier scheduling/cross-carrier transmission occurs in a current data transmission.

In S1002, the network device transmits the scheduling instruction to a terminal, to make the terminal determine a number of channel repetition transmissions for the current data transmission based on a number of channel repetition transmissions of an original carrier and/or a target carrier.

The cross-carrier scheduling includes that the network device transmits the scheduling instruction on the original carrier and instructs a terminal to perform data transmission on the target carrier, and the cross-carrier transmission includes that the network device transmits the scheduling instruction on the original carrier and instructs the terminal to perform data transmission on the original carrier and the target carrier.

Optionally, the scheduling instruction indicates that the cross-carrier scheduling occurs, and following transmitting the scheduling instruction to the terminal, the method further includes: performing data transmission on the target carrier with the terminal using the number of channel repetition transmissions for the current data transmission, wherein the number of channel repetition transmissions for the current data transmission is the number of channel repetition transmissions of the target carrier.

Optionally, the number of channel repetition transmissions of the target carrier includes multiple values, and the scheduling instruction further indicates one of the multiple values, to make the terminal determine the one of the multiple values based on the scheduling instruction and determine the number of channel repetition transmissions for the current data transmission based on the determined value.

Optionally, the number of channel repetition transmissions for the current data transmission is a maximum one among the number of channel repetition transmissions of the original carrier and the number of channel repetition transmissions of the target carrier.

Optionally, the scheduling instruction indicates that the cross-carrier transmission occurs, and following transmitting the scheduling instruction to the terminal, the method further includes: determining to perform data transmission on the original carrier with the terminal for a portion of the number of channel repetition transmissions for the current data transmission; and determining to perform data transmission on the target carrier with the terminal for remaining of the number of channel repetition transmissions for the current data transmission.

Optionally, the scheduling instruction further indicates an index of a transmission coefficient, to make the terminal determine the transmission coefficient based on the index of the transmission coefficient, and determine, based on the transmission coefficient, a number of actual channel repetition transmissions of the original carrier in the current data transmission, and a number of actual channel repetition transmissions of the target carrier in the current data transmission; wherein the transmission coefficient indicates a ratio of the number of actual channel repetition transmissions of the original carrier/target carrier in the current data transmission to the number of channel repetition transmissions for the current data transmission.

Optionally, the number of actual channel repetition transmissions of one of the original carrier and target carrier in the current data transmission is a product of the number of channel repetition transmissions for the current data transmission and the transmission coefficient, and the number of actual channel repetition transmissions of the other of the original carrier and target carrier in the current data transmission is a difference between the number of channel repetition transmissions for the current data transmission and the product.

Optionally, the number of channel repetition transmissions for the current data transmission is a maximum one among the number of channel repetition transmissions of the original carrier and the number of channel repetition transmissions of the target carrier.

Optionally, the number of channel repetition transmissions for the current data transmission is determined to be the number of channel repetition transmissions of one of the original carrier and the target carrier based on the transmission coefficient.

Optionally, the method further includes: calculating a product of the number of channel repetition transmissions of one of the original carrier and the target carrier and the transmission coefficient, as the number of actual channel repetition transmissions of the one carrier; calculating a difference between 1 and the transmission coefficient, and recording the difference as an intermediate coefficient; and calculating a product of the number of channel repetition transmissions of the other of the original carrier and the target carrier and the intermediate coefficient, as the number of actual channel repetition transmissions of the other carrier.

Optionally, the scheduling instruction indicates that the cross-carrier transmission occurs, and the method further includes: determining a number of actual repetition transmissions for data transmitted on the original carrier in the current data transmission based on the number of channel repetition transmissions of the original carrier; and determining a number of actual repetition transmissions for data transmitted on the target carrier in the current data transmission based on the number of channel repetition transmissions of the original carrier.

Optionally, the scheduling instruction further indicates data transmitted on the original carrier and/or data transmitted on the target carrier for the current data transmission.

Optionally, the data partly takes TB as a granularity unit.

Optionally, the scheduling instruction is scheduling information carried in DCI and/or a random access response.

Optionally, channels for the current data transmission at least include PUSCH and PDSCH.

The method as shown in FIG. 10 may be performed by the network device (such as a base station or an AP), which corresponds to a terminal side. More details about a working principle and a working mode of the method in FIG. 2 may be referred to relevant descriptions on the network device or the network side as shown in FIG. 2 to FIG. 9 and are not repeated here.

Figure 11:
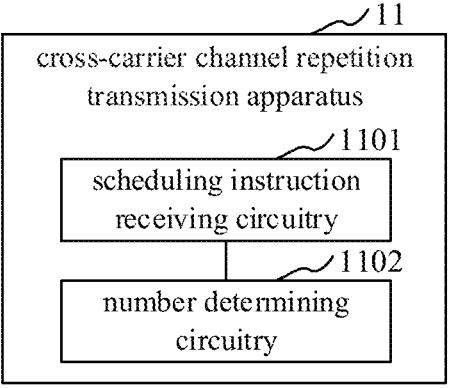
FIG. 11 is a structural diagram of a cross-carrier channel repetition transmission apparatus according to an embodiment.

Referring to FIG. 11, FIG. 11 is a structural diagram of a cross-carrier channel repetition transmission apparatus 11 according to an embodiment. The apparatus 11 includes a scheduling instruction receiving circuitry 1101 and a number determining circuitry 1102. The scheduling instruction receiving circuitry 1101 is configured to receive a scheduling instruction for data transmission from a network device, wherein the scheduling instruction indicates that cross-carrier scheduling/cross-carrier transmission occurs in a current data transmission. The number determining circuitry 1102 is configured to determine a number of channel repetition transmissions for the current data transmission based on a number of channel repetition transmissions of an original carrier and/or a target carrier. The cross-carrier scheduling includes that the network device transmits the scheduling instruction on the original carrier and instructs a terminal to perform data transmission on the target carrier, and the cross-carrier transmission includes that the network device transmits the scheduling instruction on the original carrier and instructs the terminal to perform data transmission on the original carrier and the target carrier.

More details of working principles and working modes of the apparatus 11 can be referred to related descriptions on the method in FIG. 2 to FIG. 9 and are not repeated here.

In some embodiments, the apparatus 11 may correspond to a chip with a cross-carrier channel repetition transmission function in a UE, or to a chip with a data processing function, such as a System-On-Chip (SOC) or a baseband chip, or to a chip module including a chip with a cross-carrier channel repetition transmission function in the UE, or to a chip module including a chip with a data processing function, or to the UE.

Figure 12:
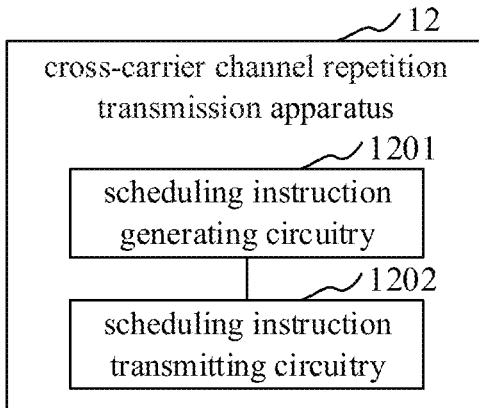
FIG. 12 is a structural diagram of a cross-carrier channel repetition transmission apparatus according to an embodiment.

Referring to FIG. 12, FIG. 12 is a structural diagram of a cross-carrier channel repetition transmission apparatus 12 according to an embodiment. The apparatus 12 includes a scheduling instruction generating circuitry 1201 and a scheduling instruction transmitting circuitry 1202. The scheduling instruction generating circuitry 1201 is configured to generate a scheduling instruction for data transmission, wherein the scheduling instruction indicates that cross-carrier scheduling/cross-carrier transmission occurs in a current data transmission. The scheduling instruction transmitting circuitry 1202 is configured to transmit the scheduling instruction to a terminal, to make the terminal determine a number of channel repetition transmissions for the current data transmission based on a number of channel repetition transmissions of an original carrier and/or a target carrier. The cross-carrier scheduling includes that the network device transmits the scheduling instruction on the original carrier and instructs a terminal to perform data transmission on the target carrier, and the cross-carrier transmission includes that the network device transmits the scheduling instruction on the original carrier and instructs the terminal to perform data transmission on the original carrier and the target carrier.

More details of working principles and working modes of the apparatus 12 can be referred to related descriptions on the method in FIG. 10 and are not repeated here.

In some embodiments, the apparatus 12 may correspond to a chip with a cross-carrier channel repetition transmission function in a network device, or to a chip with a data processing function, such as an SOC or a baseband chip, or to a chip module including a chip with a cross-carrier channel repetition transmission function in the network device, or to a chip module including a chip with a data processing function, or to the network device.

In some embodiments, each module/unit of each apparatus and product described in the above embodiments may be a software module/unit or a hardware module/unit or may be a software module/unit in part, and a hardware module/unit in part. For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a storage medium having computer instructions stored therein is provided, wherein when the computer instructions are executed by a processor, any one of the methods as shown in FIG. 1 and FIG. 10 is performed. In some embodiments, the storage medium may include a non-volatile or a non-transitory memory. In some embodiments, the storage medium may include an optical disk, a hard disk drive or a solid-state drive.

In an embodiment of the present disclosure, a terminal is provided and may be a UE. The terminal includes the apparatus 11 as shown in FIG. 11 or including a memory and a processor, wherein the memory has a computer program stored therein, and when the processor executes the computer program, the above method as shown in FIG. 2 to FIG. 9 is performed.

In an embodiment of the present disclosure, a network device including the apparatus 12 as shown in FIG. 12 or including a memory and a processor is provided, wherein the memory has a computer program stored therein, and when the processor executes the computer program, the above method as shown in FIG. 10 is performed.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

It should be understood that the term "and/or" in the present disclosure is merely an association relationship describing associated objects, indicating that there can be three types of relationships, for example, A and/or B can represent "A exists only", both A and B exist, B exists only. In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

The invention claimed is:

1. A cross-carrier channel repetition transmission method, comprising:

receiving a scheduling instruction for data transmission from a network device, wherein the scheduling instruction indicates that cross-carrier transmission occurs in a current data transmission; and determining a number of channel repetition transmissions for the current data transmission based on a number of channel repetition transmissions of an original carrier and/or a target carrier;

wherein the cross-carrier transmission comprises that the network device transmits the scheduling instruction on the original carrier and instructs a terminal to perform data transmission on the original carrier and the target carrier; and wherein following determining the number of channel repetition transmissions for the current data transmission based on the number of channel repetition transmissions of the original carrier and/or the target carrier, the method further comprises:

determining to perform data transmission on the original carrier with the network device for a portion of the number of channel repetition transmissions for the current data transmission; and determining to perform data transmission on the target carrier with the network device for remaining of the number of channel repetition transmissions for the current data transmission; or wherein said determining the number of channel repetition transmissions for the current data transmission based on the number of channel repetition transmissions of the original carrier and/or the target carrier comprises:

determining a number of actual repetition transmissions for data transmitted on the original carrier in the current data transmission based on the number of channel repetition transmissions of the original carrier; and determining a number of actual repetition transmissions for data transmitted on the target carrier in the current data transmission based on the number of channel repetition transmissions of the original carrier.

2. The method according to claim 1, wherein the scheduling instruction further indicates an index of a transmission coefficient, and the method further comprises:

determining the transmission coefficient based on the index of the transmission coefficient, wherein the transmission coefficient indicates a ratio of a number of actual channel repetition transmissions of the original carrier/target carrier in the current data transmission to the number of channel repetition transmissions for the current data transmission; and determining, based on the transmission coefficient, the number of actual channel repetition transmissions of the original carrier in the current data transmission, and the number of actual channel repetition transmissions of the target carrier in the current data transmission.

3. The method according to claim 2, wherein said determining, based on the transmission coefficient, the number of actual channel repetition transmissions of the original carrier in the current data transmission, and the number of actual channel repetition transmissions of the target carrier in the current data transmission comprises:

calculating a product of the number of channel repetition transmissions for the current data transmission and the transmission coefficient, and determining the number of actual channel repetition transmissions of one of the original carrier and target carrier in the current data transmission based on the product; and calculating a difference between the number of channel repetition transmissions for the current data transmission and the product, and determining the number of actual channel repetition transmissions of the other of the original carrier and target carrier in the current data transmission based on the difference.

4. The method according to claim 3, wherein a maximum one among the number of channel repetition transmissions of the original carrier and the number of channel repetition transmissions of the target carrier is selected, and the number of channel repetition transmissions for the current data transmission is determined based on the maximum one.

5. The method according to claim 3, wherein the number of channel repetition transmissions for the current data transmission is determined to be the number of channel repetition transmissions of one of the original carrier and the target carrier based on the transmission coefficient.

6. The method according to claim 2, wherein said determining, based on the transmission coefficient, the number of actual channel repetition transmissions of the original carrier in the current data transmission, and the number of actual channel repetition transmissions of the target carrier in the current data transmission comprises:

calculating a product of the number of channel repetition transmissions of one of the original carrier and the target carrier and the transmission coefficient, as the number of actual channel repetition transmissions of the one carrier;

calculating a difference between 1 and the transmission coefficient, and recording the difference as an intermediate coefficient; and calculating a product of the number of channel repetition transmissions of the other of the original carrier and the target carrier and the intermediate coefficient, as the number of actual channel repetition transmissions of the other carrier.

7. The method according to claim 1, wherein the scheduling instruction further indicates data transmitted on the original carrier and/or data transmitted on the target carrier for the current data transmission.

8. The method according to claim 1, wherein the data partly takes Transport Block (TB) as a granularity unit.

9. The method according to claim 1, wherein the scheduling instruction is scheduling information carried in Downlink Control Information (DCI) and/or a random access response.

10. The method according to claim 1, wherein channels for the current data transmission at least comprise Physical Uplink Shared Channel (PUSCH) and Physical Downlink Shared Channel (PDSCH).

11. A non-transitory storage medium storing one or more programs, the one or more programs comprising computer instructions, which, when executed by a processor, cause the processor to:

receive a scheduling instruction for data transmission from a network device, wherein the scheduling instruction indicates that cross-carrier transmission occurs in a current data transmission; and determine a number of channel repetition transmissions for the current data transmission based on a number of channel repetition transmissions of an original carrier and/or a target carrier;

wherein the cross-carrier transmission comprises that the network device transmits the scheduling instruction on the original carrier and instructs a terminal to perform data transmission on the original carrier and the target carrier; and wherein the processor is further caused to:

following determining the number of channel repetition transmissions for the current data transmission based on the number of channel repetition transmissions of the original carrier and/or the target carrier, determine to perform data transmission on the original carrier with the network device for a portion of the number of channel repetition transmissions for the current data transmission; and determine to perform data transmission on the target carrier with the network device for remaining of the number of channel repetition transmissions for the current data transmission; or wherein the processor is caused to:

determine a number of actual repetition transmissions for data transmitted on the original carrier in the current data transmission based on the number of channel repetition transmissions of the original carrier; and determine a number of actual repetition transmissions for data transmitted on the target carrier in the current data transmission based on the number of channel repetition transmissions of the original carrier.

12. A terminal, comprising a memory and processor, wherein the memory stores one or more programs, the one or more programs comprising computer instructions, which, when executed by the processor, cause the processor to:

receive a scheduling instruction for data transmission from a network device, wherein the scheduling instruction indicates that cross-carrier transmission occurs in a current data transmission; and determine a number of channel repetition transmissions for the current data transmission based on a number of channel repetition transmissions of an original carrier and/or a target carrier;

wherein the cross-carrier transmission comprises that the network device transmits the scheduling instruction on the original carrier and instructs a terminal to perform data transmission on the original carrier and the target carrier; and wherein the processor is further caused to:

following determining the number of channel repetition transmissions for the current data transmission based on the number of channel repetition transmissions of the original carrier and/or the target carrier, determine to perform data transmission on the original carrier with the network device for a portion of the number of channel repetition transmissions for the current data transmission; and determine to perform data transmission on the target carrier with the network device for remaining of the number of channel repetition transmissions for the current data transmission; or wherein the processor is caused to:

determine a number of actual repetition transmissions for data transmitted on the original carrier in the current data transmission based on the number of channel repetition transmissions of the original carrier; and determine a number of actual repetition transmissions for data transmitted on the target carrier in the current data transmission based on the number of channel repetition transmissions of the original carrier.

* * * * *